United States Patent [19]

Brunken et al.

[11] Patent Number: 4,676,355

[45] Date of Patent: Jun. 30, 1987

[54] FLUID FRICTION CLUTCH

[75] Inventors: Gerd Brunken, Dittelbrunn; Werner Göb, Kürnach; Dieter Neugebauer, Schweinfurt, all of Fed. Rep. of Germany

[73] Assignee: Fichtel & Sachs AG, Schweinfurt, Fed. Rep. of Germany

[21] Appl. No.: 854,335

[22] Filed: Apr. 21, 1986

[30] Foreign Application Priority Data

Apr. 25, 1985 [DE] Fed. Rep. of Germany ....... 3514883
Jun. 5, 1985 [DE] Fed. Rep. of Germany ....... 3520140

[51] Int. Cl.$^4$ ............................................. F16D 35/00
[52] U.S. Cl. ................................ 192/58 B; 192/82 T; 192/85 R
[58] Field of Search ................. 192/58 B, 58 C, 58 R, 192/85 R, 82 T

[56] References Cited

U.S. PATENT DOCUMENTS

| | | | |
|---|---|---|---|
| 3,215,235 | 11/1965 | Kamm | 192/58 B |
| 3,400,796 | 9/1968 | Savins et al. | |
| 4,488,628 | 12/1984 | Kluna et al. | 192/58 B |
| 4,610,341 | 9/1986 | Hauser et al. | 192/58 B |

FOREIGN PATENT DOCUMENTS

| | | |
|---|---|---|
| 3419927 | 12/1984 | Fed. Rep. of Germany . |
| 8235536 | 4/1985 | Fed. Rep. of Germany . |
| 1060143 | 3/1967 | United Kingdom . |
| 1412583 | 11/1975 | United Kingdom . |
| 1475141 | 6/1977 | United Kingdom . |

Primary Examiner—Carl D. Friedman
Assistant Examiner—Richard E. Chilcot, Jr.
Attorney, Agent, or Firm—Toren, McGeady & Associates

[57] ABSTRACT

The fluid friction clutch comprises a clutch input part drivable about a rotation axis and a clutch output part rotatable coaxially in relation to the clutch input part. The clutch output part together with the clutch input part defines at least one shear gap. A cover which forms a cavity enclosing at least the region of the shear gap is filled partially with viscous fluid and otherwise with gas. The gas-filled volume of the cavity contains less than 18 percent of oxygen by volume, preferably not more than 5 percent of oxygen by volume, in order to preclude a chemical reaction of the viscous fluid with the oxygen under thermal overloading which limits the utility of the viscous fluid. To reduce the proportion of oxygen either the cavity is evacuated or it is filled with a substantially oxygen-free protective or noble gas.

5 Claims, 1 Drawing Figure

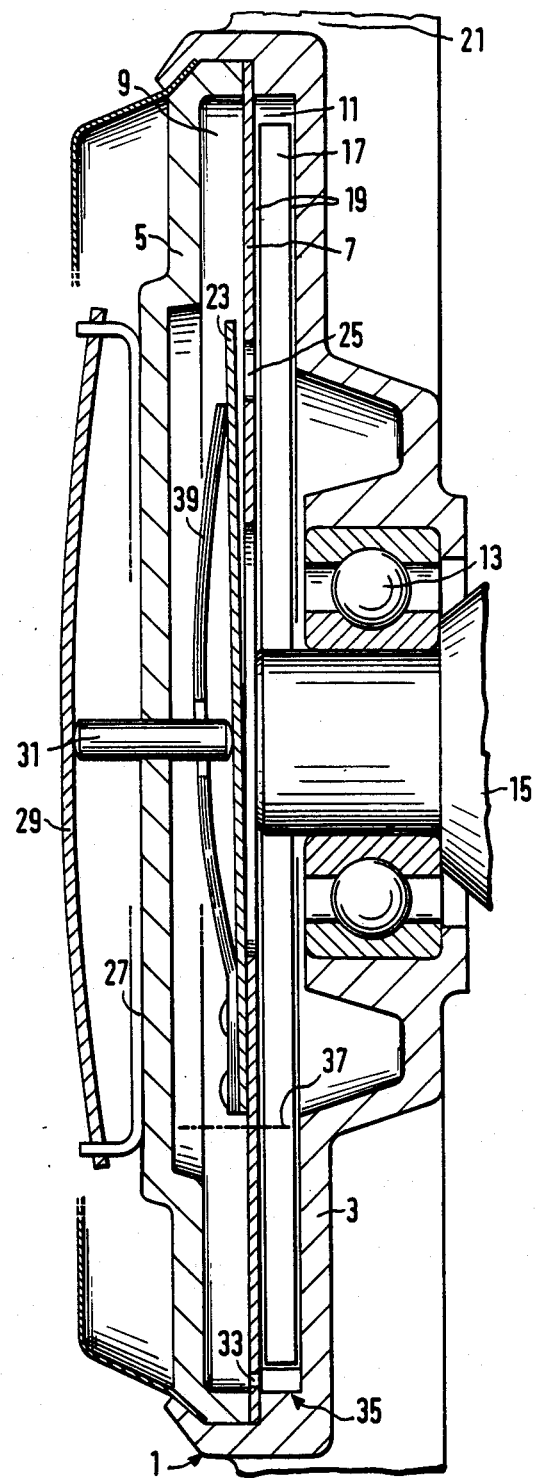

FLUID FRICTION CLUTCH

BACKGROUND OF THE INVENTION

The invention relates to a fluid friction clutch.

Fluid friction clutches are known for the most various fields of application. Usually a fluid friction clutch comprises a clutch input part drivable about a rotation axis, a clutch output part rotatable coaxially in relation to the clutch input part, which together with the clutch input part defines at least one shear gap, and a cover the cavity of which, enclosing at least the region of the shear gap, is filled partially with viscous fluid and otherwise with air.

From U.S. Pat. No. 3,400,796 a fluid friction clutch is known the shear gap width of which is variable for the control of the force transmission. From German Publ. Spec. No. 3,419,927 a fluid friction clutch is known which is formed as by-pass clutch in a hydrodynamic torque converter. Finally from German Utility Model No. 8,235,536 a fluid friction clutch for a cooling air fan of an internal combustion engine is known, in which the transmitted torque is controllable in dependence upon temperature The silicone oil used in such fluid friction clutches as viscous fluid is thermally stressed in operation. The thermal overloading of the viscous fluid reduces the life of the fluid. This is the case especially if high demands are made on the torque transmission capacity of the viscous fluid. The thermal loading of the viscous fluid could per se be reduced by the use of larger and thus more powerful fluid friction clutches. In most practical cases however this is not possible for reasons of space, weight and cost.

Now the invention is directed towards provision of a fluid friction clutch in which the viscous fluid has a comparatively long life even in the case of increased thermal loading.

SUMMARY OF THE INVENTION

According to the invention the gas-filled volume of the cavity of the cover enclosing at least the region of the shear gap of the fluid friction clutch contains less than 18 percent of oxygen by volume. The invention is based upon the knowledge that one essential cause for the failure of the viscous fluid on thermal loading is a chemical reaction of the silicone oil used as viscous fluid with the oxygen situated in the cavity, which causes the silicone oil to gel. The reduction of the oxygen proportion avoids a reaction of the silicone oil with oxygen and considerably lengthens the life within which the silicone oil is usable for the desired purpose. If for example the gas is air, the oxygen proportion can be reduced by a reduction of the gas pressure below the atmospheric pressure. Alternatively it has proved favorable if the air in the cavity of the cover is replaced by an oxygen-free protective gas, especially a rare or noble gas, in order not to additionally load the seals of the cover by negative pressure.

The invention can be used in fluid friction clutches of all kinds, for example in by-pass clutches in hydrodynamic torque converters, compensation gear clutches for four-wheel drive systems and especially also in clutches for cooling air fans of internal combustion engines.

The various features of novelty which characterize the invention are pointed out with particularity in the claims annexed to and forming a part of this disclosure.

For a better understanding of the invention, its operating advantages and specific objects attained by its use, reference should be had to the accompanying drawing and descriptive matter in which there is illustrated and described a preferred embodiment of invention.

BRIEF DESCRIPTION OF THE DRAWING

The drawing shows an axial longitudinal section through a fluid friction clutch for a cooling air fan of an internal combustion engine.

DETAIL DESCRIPTION OF THE DRAWING

The fan clutch as illustrated in the drawing comprises a gas-tight cover designated generally by 1, having a rear wall 3 and a front wall 5. A partition 7 divides the cavity, formed by the cover 1, into a reservoir 9 for a viscous fluid and a working chamber 11. The cover 1 is mounted with its rear wall 3 rotatably, through a rolling bearing 13, on a drive shaft 15 driven by the internal combustion engine, which shaft carries a rotor 17 in the working chamber 11. The rotor 17 forms shear gaps 19 with the surfaces of the rear wall 3 for the one part and the partition 7 for the other. The gaps 19, when they are filled with the shear fluid from the reservoir 9, transmit the drive torque of the drive shaft 15 to fan blades 21 integrally connected with the cover rear wall 3.

The fan clutch is engaged and disengaged in dependence upon temperature. For this purpose in the partition 7 there is provided a valve opening 25 controllable by a valve lever 23. When the valve is in the opened condition viscous fluid can pass from the reservoir 9 through the opening 25 into the working chamber 11. The valve lever 23 is controlled by a bimetallic element 29, held on the outside of the front wall 5 of the cover 1 in a holder 27, through a central point 31 guided axially displaceably in sealed manner in the front wall 5. An opening 33 arranged in the region of the external circumference of the partition 7 and co-operating in the usual way with a pump device 35 which is effective in the case of relative rotation of the rotor 17 and the cover 1 ensures the return of viscous fluid from the working chamber 11 into the reservoir 9.

In the cold condition the bimetallic element 29 closes the valve opening 25 by means of the valve lever 23 and the pump device 35 pumps the viscous fluid, contained in the working chamber 11 and the shear gaps 19, into the reservoir 9. Thus the cooling air fan is shut off. In the operationally hot condition the bimetallic element 29 opens the valve opening, whereby the viscous fluid can pass into the working chamber 11 and fill the shear gaps 19 for the torque transmission, despite the pumping action of the pump device 35. Thus the fan clutch is engaged.

The viscous fluid occupies only a part of the volume enclosed by the reservoir 9 and the working chamber 11. In the Figure 37 designates by way of example the level of the viscous fluid when the drive shaft 15 is not rotating. The remaining volume of the reservoir 9 and the working chamber 11 is filled with air in the case of conventional fluid clutches. In order to avoid gelling of the viscous fluid, which is preferably a silicone oil, by reason of a reaction with the atmospheric oxygen, in the fan clutch according to the invention the remaining internal space of the cover 1, that is of the reservoir 9 and the working chamber 11, is evacuated whereby the proportion of oxygen is substantially reduced. In order to avoid pressure loading of the cover 1 by the vacuum, the pumped-out air is expediently replaced by an oxygen-free protective gas or a rare, that is, noble gas, which again can have approximately atmospheric pressure. Since the viscous fluid no longer comes into contact with oxygen, it can be subjected to higher temperature loading without problem. In this connection it has proved favorable if the proportion of oxygen in the gas contained in the cover amounts to less than 5 percent by volume of the remaining volume occupied by the gas.

The fan clutch as represented in the Figure additionally contains a protective device by which the danger of thermal overloading of the fan clutch can be further reduced. However if desired the protective device can be omitted. It comprises an additional bimetallic element 39 arranged within the reservoir 9, which responds to the temperature in the reservoir 9 and controls the valve lever 23 independently of the bimetallic element 29. The bimetallic element 39 partially closes the valve opening 25 if there is danger of thermal overloading of the viscous fluid. Thus the fan clutch is partially disengaged and the power converted by fluid friction in the fan clutch decreases, so that the internal thermal loading drops.

While a specific embodiment of the invention has been shown and described in detail to illustrate the application of the inventive principles, it will be understood that the invention may be embodied otherwise without departing from such principles.

What we claim is:

1. A fluid friction clutch, especially for a cooling air fan of an internal combustion engine, comprising a clutch input part to be driven about a rotation axis, a clutch output part coaxially rotatable in relation to the clutch input part, at least one shear gap defined by the clutch input part and the clutch output part, and a cover forming a cavity which encloses at least the region of the shear gap, said cavity being filled partially with a viscous fluid and for the remainder with gas, the gas-filled volume of the cavity containing less than 18 percent of oxygen by volume.

2. A fluid friction clutch according to claim 1, wherein the gas-filled volume of the cavity contains at most 5 percent of oxygen by volume.

3. A fluid friction clutch according to claim 1, wherein the gas in the cavity has a pressure below atmospheric pressure.

4. A fluid friction clutch according to claim 1, wherein the cavity contains a substantially oxygen-free protective gas.

5. A fluid friction clutch according to claim 4, wherein the cavity contains rare gas.

* * * * *